United States Patent [19]

Kaiser et al.

[11] Patent Number: 5,532,525
[45] Date of Patent: Jul. 2, 1996

[54] CONGENERATION POWER SYSTEM

[75] Inventors: Frederick Kaiser, Bellingham; Howard H. Bobry, Lynnwood, both of Wash.

[73] Assignee: Albar, Inc., Lynnwood, Wash.

[21] Appl. No.: 252,749

[22] Filed: Jun. 2, 1994

(Under 37 CFR 1.47)

[51] Int. Cl.⁶ .................................................... H02J 9/04
[52] U.S. Cl. ................................. 307/64; 307/18; 307/25
[58] Field of Search ................................ 307/64, 18, 25; 363/37; 323/234

[56] References Cited

U.S. PATENT DOCUMENTS

| | | |
|---|---|---|
| 1,718,238 | 6/1929 | Ketteting et al. . |
| 2,007,415 | 7/1935 | Walker . |
| 2,014,101 | 9/1935 | Bryan . |
| 2,037,183 | 4/1936 | Strieby . |
| 2,063,994 | 12/1936 | Frank et al. . |
| 2,085,072 | 6/1937 | Bobe . |
| 2,165,969 | 7/1939 | Humbert et al. . |
| 2,240,123 | 4/1941 | Shoup et al. . |
| 2,302,192 | 11/1942 | Dannheiser . |
| 2,427,678 | 9/1947 | Laging . |
| 2,688,704 | 9/1954 | Christenson . |
| 2,856,543 | 10/1958 | Dixon et al. . |
| 2,920,211 | 1/1960 | Gotoh . |
| 3,064,195 | 11/1962 | Freen . |
| 3,283,165 | 11/1966 | Bloch . |
| 3,293,445 | 12/1966 | Levy . |
| 3,305,762 | 2/1967 | Geib, Jr. . |
| 3,339,080 | 8/1967 | Howald . |
| 3,345,517 | 10/1967 | Smith . |
| 3,348,060 | 10/1967 | Jamison . |
| 3,435,358 | 3/1969 | Rheinfelder . |
| 3,458,710 | 7/1969 | Dodge . |
| 3,525,035 | 8/1970 | Kakalec . |
| 3,525,078 | 8/1970 | Baggott . |
| 3,636,368 | 1/1972 | Sia . |
| 3,678,284 | 7/1972 | Peters . |
| 3,691,393 | 9/1972 | Papachristou . |
| 3,859,589 | 1/1975 | Rush . |
| 3,943,447 | 3/1976 | Shomo, III . |
| 4,170,761 | 10/1979 | Kopphele . |
| 4,233,558 | 11/1980 | Gaertner ..................................... 323/17 |
| 4,460,834 | 7/1984 | Gottfried . |
| 4,475,047 | 10/1984 | Ebert, Jr. ................................. 307/66 |
| 4,667,116 | 5/1987 | Honjo et al. ............................. 307/64 |
| 4,686,375 | 8/1987 | Gottfried ..................................... 290/2 |
| 4,719,550 | 1/1988 | Powell et al. . |
| 4,745,299 | 5/1988 | Eng et al. . |
| 4,748,341 | 5/1988 | Gupta . |
| 4,748,342 | 5/1988 | Dijkmans . |
| 4,763,014 | 8/1988 | Model et al. . |
| 5,010,469 | 4/1991 | Bobry . |
| 5,057,698 | 10/1991 | Widener et al. . |
| 5,172,009 | 12/1992 | Mohan . |
| 5,185,536 | 2/1993 | Johnson, Jr. et al. . |
| 5,198,698 | 3/1993 | Paul et al. ................................ 307/64 |
| 5,198,970 | 3/1993 | Kawabata et al. . |
| 5,237,208 | 8/1993 | Tominaga et al. ....................... 307/66 |
| 5,302,858 | 4/1994 | Folts . |
| 5,347,164 | 9/1994 | Yeh ........................................... 307/66 |

FOREIGN PATENT DOCUMENTS

2005118  4/1979  United Kingdom .

Primary Examiner—William M. Shoop, Jr.
Assistant Examiner—Albert W. Paladini
Attorney, Agent, or Firm—Hughes, Multer & Schacht

[57] ABSTRACT

A secondary power system eliminates the need for an automatic transfer switch and permits simultaneous supply from different sources. Primary power is rectified and connected to a DC bus, an AC generator has its output rectified and connected to the DC bus, and a storage battery is also connected to the DC bus. Current on the DC bus is inverted to AC to provide an uninterrupted power supply. The system is connected to a household electrical system by a power distribution panel which can be installed in a home prior to the secondary power system and can facilitate installation of the secondary system. The distribution panel can selectively bypass the secondary system and can disconnect non-vital loads when primary power is not available. The generator is powered by an engine using gasoline, natural gas or water, which can also power other systems, such as air conditioning, with exhaust heat or rotary motion.

17 Claims, 8 Drawing Sheets

CONGENERATION POWER SYSTEM

BACKGROUND OF THE INVENTION

1. Field of the Invention

This invention relates generally to the field of power distribution and specifically to a secondary power system.

2. Description of Related Art

Power supplied to the public is generally reliable, but weather and other circumstances can lead to interruptions in the power supply lasting seconds, minutes or hours. In rural areas, these power interruptions are more frequent and of longer duration than in urban areas. An extended power interruption means that power is not available for sump pumps, refrigerators and other vital appliances. Many people have vacation homes in rural areas which are unattended for long periods of time. When power is interrupted and the home is unattended, flooding, food spoilage and other problems can arise. Thus, it is desirable to have available a secondary power supply which does not require the presence of an operator.

Although power is more reliable in urban areas, even a brief interruption can have adverse results. Businesses which rely on computers can be affected by a momentary power interruption. Thus, it is desirable to have a secondary power system which ensures an uninterrupted power supply.

Myriad systems for providing secondary, or emergency, power have been devised. Among them are generators which are started manually or automatically, however, to provide uninterrupted power with a generator based system, the generator must be running at all times and an instantaneous transfer must be possible upon a failure of the normal power supply. Many generators are driven by gasoline engines which must be refueled periodically. This may be impractical in a vacation home which may be vacant for an entire season.

A system which uses an alternating current generator requires switching from one AC supply to another. Connecting together different alternating current power supplies creates problems when the phase and frequency do not precisely correspond. Thus, these emergency power systems require a transfer switch to selectively connect the preferred power supply to a distribution system. Transfer switches can be manual or automatic. Manual transfer switches require the presence of an operator and are slow. Automatic transfer switches are faster, but still do not provide uninterrupted power because of their response time. Faster electronic automatic bus transfer switches have been developed, however, even an instantaneous transfer switch would create safety problems such as the inability to isolate a fault immediately downstream from the transfer switch.

Also common are batteries which are connected to inverters to supply alternating current when the normal, commercial power supply is interrupted. These also require the ability to transfer power and the incident problems. In addition, if the power is to be supplied for any length of time, the batteries must be large and will require significant maintenance.

Systems which generate power simultaneously with the normal power supply have been proposed. These are designed to sell power back to the utility when the power generated exceeds the amount required. This type of system requires the generator to be running regularly and presents certain safety and regulatory obstacles.

Thus, it is desirable to provide an emergency power system which provides uninterrupted power with a minimum of maintenance and a minimum amount of energy consumption.

A related problem is the difficulty in installing a backup power system. Home distribution panels are not designed for connecting additional power supplies to the panel. In many cases, the utility company must shut off power in order to make such a connection. Because of this panel design and the aforementioned problems of connecting an AC supply to the commercial power supply, a means for connecting a backup power system without involving the utility is desired.

SUMMARY OF THE INVENTION

The present invention provides a secondary power supply system for use as an alternative to a primary alternating current power supply. A first rectifier is connected to a direct current bus and is connectable to the primary power supply to rectify the alternating current from the primary power supply to direct current on the direct current bus. A direct current power source is also connected to the direct current bus. An inverter is connected between the direct current bus and an alternating current bus to invert the direct current to alternating current on the alternating current bus.

To facilitate installation and use, the secondary power supply also includes a power distribution panel connected between the primary power supply and the first rectifier. The panel provides a first means to selectively connect the primary power supply to the alternating current bus, a second means to selectively connect the primary power supply to the first rectifier and a third means to selectively connect the alternating current bus to alternating current from the inverter.

In operation, the first rectifier converts the primary power from the commercial power supply to direct current on the DC bus. The direct current is then inverted to alternating current on the AC bus by the inverter. The distribution panel controls distribution of the power on the AC bus to various load circuits through fuses and circuit breakers as is known in household and other applications. Power on the DC bus also charges a battery used as a DC source. A generator can be used as the DC source and would normally be idle. When commercial power is available, which should be most of the time, this is the mode of operation.

When the commercial power supply is interrupted, the battery instantaneously provides direct current to the DC bus which is inverted to alternating current on the AC bus by the inverter. The power is provided to the load circuits through the distribution panel. Thus, there is no interruption of power to the load circuits when the commercial power supply is interrupted.

The generator provides an additional power supply. After a specified time or when the charge on the battery falls to a specified level, the generator is started, manually or automatically, to provide power to the DC bus which is inverted to power on the AC bus. Thus, power can be maintained during a prolonged commercial power interruption without the need for an exceedingly large battery. When the generator is automatic and is driven by natural gas or water, the power can be supplied indefinitely without the presence of an operator.

The generator driver and its exhaust can be used for other devices to reduce the electrical load and improve the overall efficiency of the system. In some cases, the generator may be used to power such a device while commercial power is available.

When commercial power is restored, it recharges the battery and the generator is shut down. Again, power is provided from the commercial source to the direct current bus through the first rectifier. Power on the direct current bus is then inverted to power on the alternating current bus. This occurs without interruption of power to the load circuits.

The distribution panel facilitates installation and maintenance of the secondary power supply system. It can be installed prior to installation of the secondary power system to control power to household electrical loads in the same manner as is common for household power distribution. Unlike typical panels, the present invention provides terminals for connection to inputs and outputs of the secondary power system. After the secondary power system is connected to the terminals, switches or shorting inserts provided with the panel can be used to connect the input of the secondary system to the primary power supply and the output of the secondary system to the alternating current bus. The primary power supply is disconnected from the AC bus to prevent simultaneous connection of two AC sources. The panel can also have a non-vital AC bus which remains connected to the primary power and is not connected to the secondary power. Once the panel is installed, the secondary power system can be installed or removed without disconnecting the commercial power supply to the home.

DESCRIPTION OF THE PREFERRED EMBODIMENTS

Figure 1:
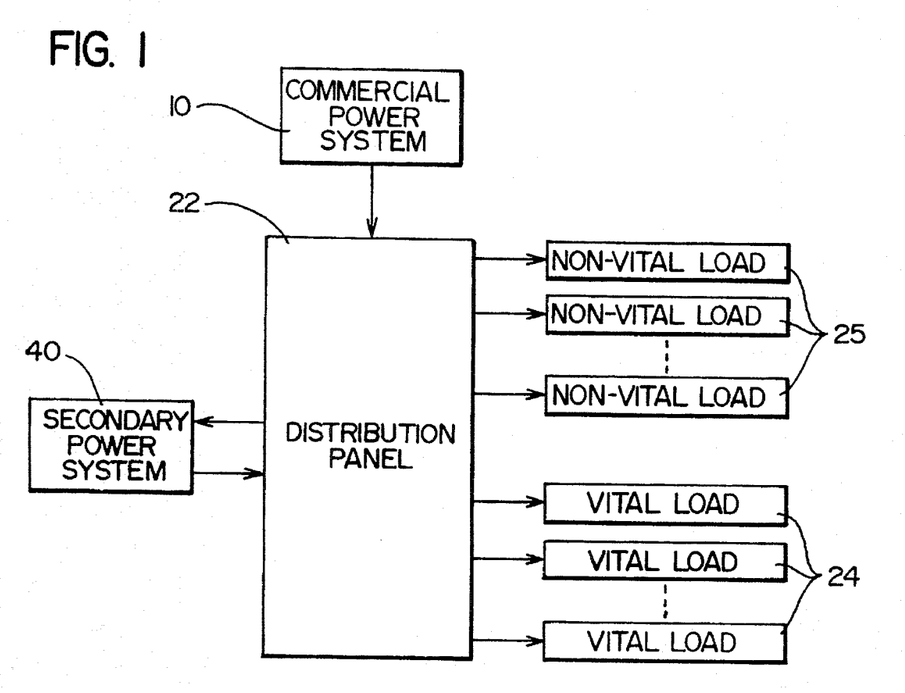
FIG. 1 is a block diagram showing a distribution panel of the present invention in a typical environment in which it is used.

Referring initially to FIG. 1, the invention is shown connected to a primary power alternating current power supply such as commercial power 10. However, the invention is designed for use with any alternating current supply. Typically, commercial power is supplied through a distribution transformer 12 (FIG. 4) which supplies 240 volts across its secondary windings 14. The transformer 12 has a center tap 16 which is a grounded neutral voltage N so that 120 volts relative to ground are supplied at each of two supply taps 18 on the secondary windings 14.

Referring back again to FIG. 1, in a normal power distribution system, commercial power is connected to an alternating current bus 20 (FIGS. 5-8) in a power distribution panel 22 which provides power to a plurality of load circuits 24 and 25. The difference between the load circuits 24 and 25 will be explained in detail below. According to the invention, the distribution panel 22 selectively connects the commercial power to the alternating current bus 20 or to a secondary power supply system 40. Details of the distribution panel are discussed below with reference to FIGS. 5-8. For the present discussion it is assumed that the distribution panel 22 connects commercial power 10 to the alternating current bus 20 only through the secondary power supply system 40.

Unless otherwise noted, in the following discussion, primary reference will be made to the block diagram of FIG. 2. When a description of the contents of the blocks shown in FIG. 2 is provided, the reader will be directed by a parenthetical expression to the appropriate figure.

Figure 2:
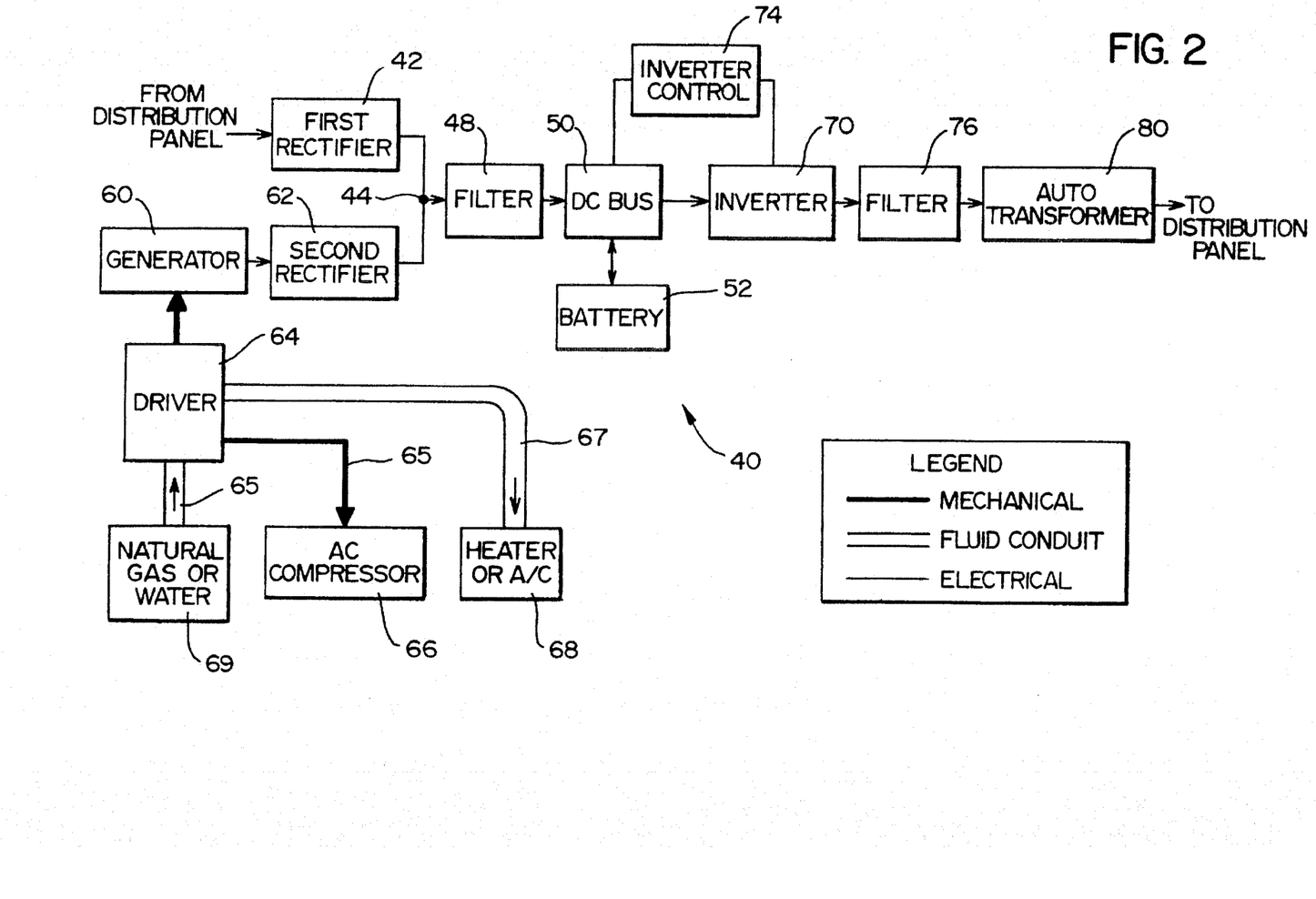
FIG. 2 is a block diagram showing the relationship between the mechanical and electrical components of the secondary power system shown in FIG. 1 along with the electrical, mechanical, and fluid connections between these components.
Figure 3:
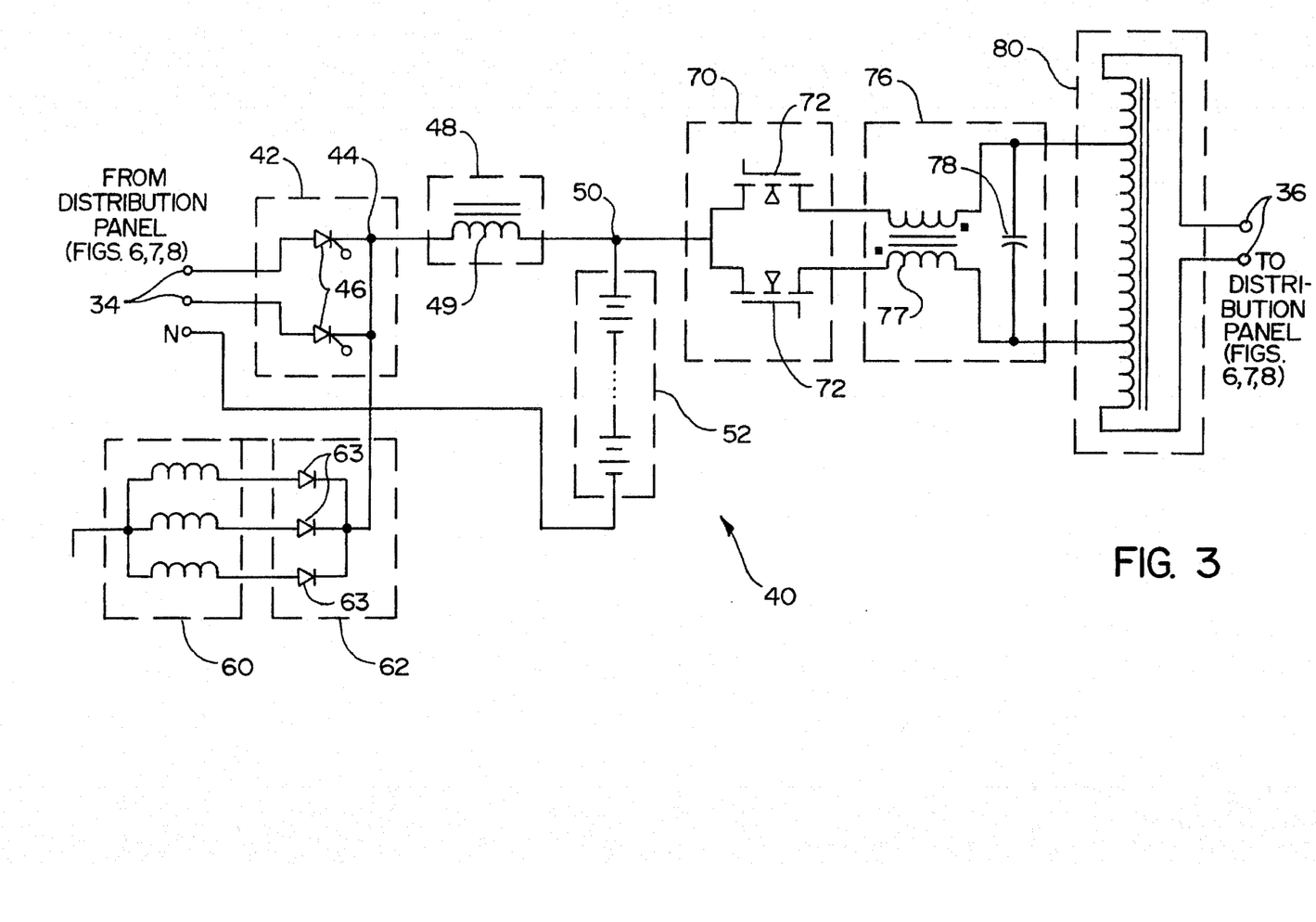
FIG. 3 is a simplified electrical schematic diagram showing the electrical elements of the secondary power system shown in FIG. 2, with broken lines indicating the relationship between the electrical components in FIG. 2 and the electrical elements in FIG. 3.

Referring now to FIG. 2, it can be seen that a first rectifier 42 is connected to terminals 34 and thus to the commercial power 10 through the distribution panel 22 to provide direct current to a direct current input node 44. The rectifier 42 is preferably a phase-controlled, full-wave rectifier including two semiconductor controlled rectifiers 46 (FIG. 3). Many SCR's are suitable, and Powerex #C180D has been used successfully.

The first rectifier 42 is connected to a direct current bus 50. Preferably this connection is made through a filter 48 such as an inductor 49 (FIG. 3) to smooth the rectified current.

At least one direct current power source is also connected to the direct current bus. In the embodiment shown, two direct current sources are used. The first DC source is an electrical storage battery 52 connected between the DC bus 50 and the neutral N. The battery should be selected so that it can be charged by the rectified commercial power supplied to the DC bus. For a 120 VAC supply, a lead acid battery having a normal voltage range of 63 to 85 volts is suitable. The current capacity depends on the number and size of loads to be powered.

As shown, the second DC source is an alternating current generator 60 connected to the direct current bus 50 through a second rectifier 62. Preferably, the second rectifier 62 is connected at the DC input node 44 so that the rectified current from the generator is filtered by the inductor 49. The generator shown is a three-phase wye-connected generator connected to the neutral N. The second rectifier 62 is a half-wave rectifier including three diodes 63 (FIG. 3).

The generator 60 can be powered by a driver 64 (FIG. 2; not shown in FIG. 3) such as an internal combustion engine fueled by natural gas, gasoline or another fuel, such as LP gas or heating oil. Alternatively the generator 60 can be powered by other means which can operate independently from the commercial power supply, such as water from a public supply. The use of natural gas or water 69 to power the generator 60 is desirable because most homes or facilities in which the present invention would be installed are equipped with water and gas supplies which would supply power indefinitely. The generator 60 can be equipped to start automatically upon a loss of commercial power for a specified time or when the charge on the battery falls to a specified level.

The drive means of the generator can have a shaft 65 which is equipped to drive an air conditioner compressor 66 or other mechanical device. Exhaust heat from the generator drive means can be directed through a heat duct 67 for use in a heating system 68, an absorption air conditioner or refrigerator, a water heater, a pool, a spa or some other device.

The DC bus 50 is connected to an inverter 70. Direct current to alternating current inverters are known in the art and a suitable device would be a pulse-width modulated sine wave inverter including a pair of transistor assemblies 72 (FIG. 3). For example, an assembly of eight International Rectifier #IRFP360 MOSFET's has been found to be suitable. An inverter control circuit 74 (FIG. 2; not shown in FIG. 3) is provided to control the transistors 72. The control circuit 74 can also be used to regulate the output of the inverter 70. Feedback controllers are known and can be used. Alternatively, where precise voltage regulation is not necessary, in household applications, for example, a controller inversely responsive to the voltage on the DC bus 50 is suitable and avoids stability problems inherent in a feedback controller.

A filter 76, such as an inductor 77 (FIG. 3) and a capacitor 78 (FIG. 3), is connected to the inverter output. A transformer, such as an autotransformer 80, is connected to terminal 36 to the inverter 70 through the filter 76 to provide the preferred supply voltage, 120 VAC, to the AC bus 20 in the distribution panel 22. The autotransformer is preferred to reduce losses and limit its size where isolation is not necessary.

In operation, the first rectifier 42 converts the primary power from the commercial power supply 10 to direct current on the DC bus 50. The direct current is then inverted to alternating current on the AC bus 20 by the inverter 70. The distribution panel 22 controls distribution of the power on the AC bus to various load circuits 24 through fuses and circuit breakers as is known in household and other applications. When the direct current source is a battery 52, power on the DC bus 50 also charges the battery when it is not fully charged. If a generator 60 is used in addition to or in place of the battery, it would normally be idle. When commercial power is available, which should be most of the time, this is the mode of operation. The primary and secondary power sources should not be connected directly to the AC bus 20 at the same time.

When the commercial power supply is interrupted, the battery 52 provides direct current to the DC bus 50 which is inverted to alternating current on the AC bus 20 by the inverter 70. Power is provided to the load circuits 24 through the distribution panel 22. Thus, there is no interruption in power to the load circuits 24 when the commercial power supply is interrupted. If only the battery 52 is used as the direct current power source, the duration during which the secondary power supply system 40 can supply power is limited by the battery size.

Figure 2A:
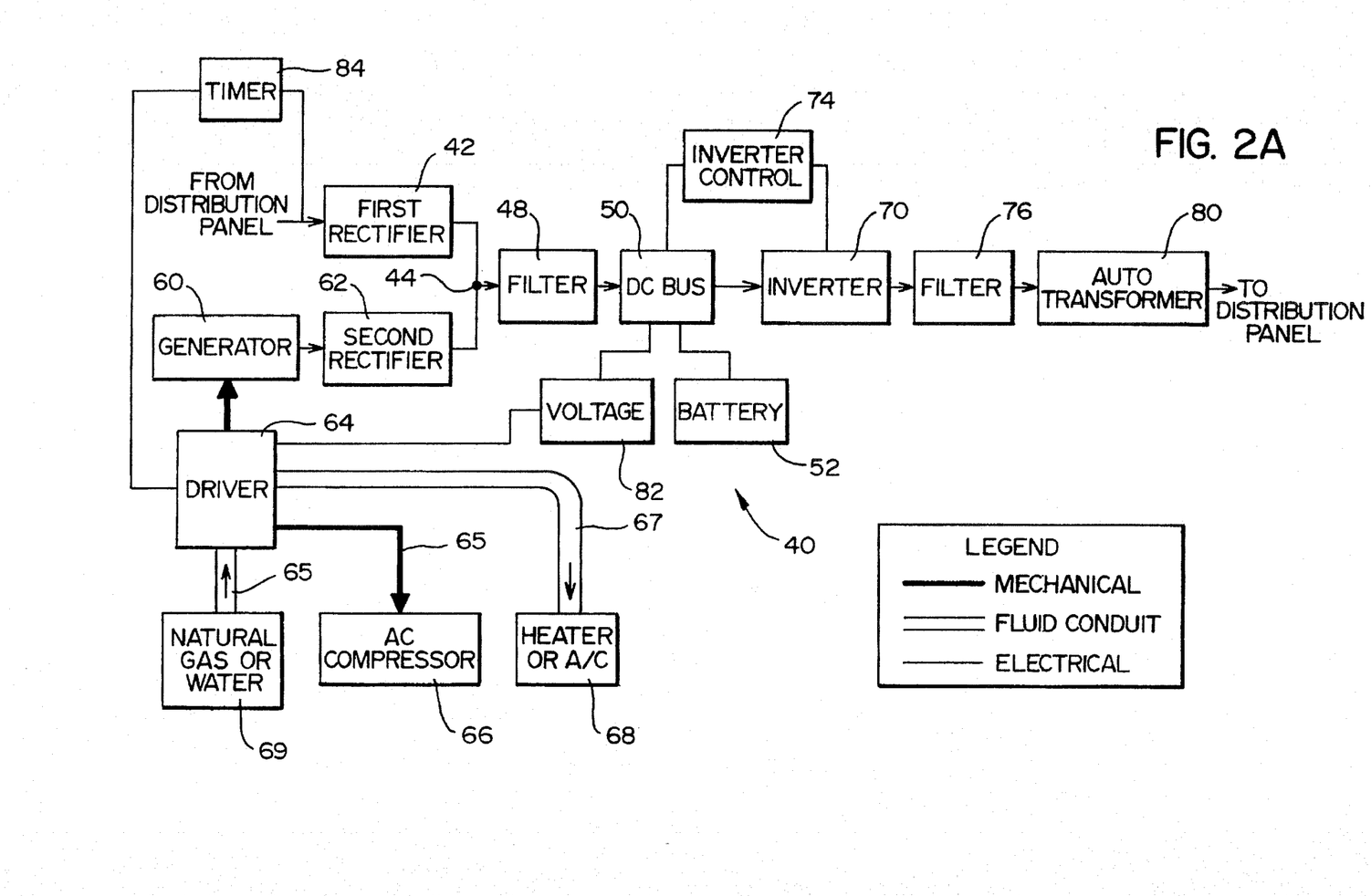
FIG. 2A is a block diagram showing the secondary power system of FIG. 2 with two additional blocks that may be used under certain circumstances.

The generator 60 provides an additional power supply. After a specified time or when the charge on the battery falls to a specified level, the generator 60 is started, manually or automatically, to provide power to the DC bus 50 which is inverted to power on the AC bus 20. As shown in FIG. 2A, a voltage detector 82 or a timer 84 can be used to sense a condition and automatically start the driver 64. Thus, power can be maintained during a prolonged commercial power interruption without the need for an exceedingly large battery. When the generator 60 is started automatically and is driven by natural gas or water, the power can be supplied indefinitely without the presence of an operator. The battery 52 remains connected when the generator 60 is operating to recharge the battery 52. Further, the battery 52 can supply momentary peaks in demand which exceed the generator's capacity, thus, a smaller generator 60 can be used.

The generator driver 64 and its exhaust can be used for other devices to reduce the electrical load and improve the overall efficiency of the system. Since all of the primary and secondary power sources are connected at the DC bus 50, the generator can be run even when commercial power is available for heating or driving the compressor 66 or other devices discussed above. Electricity generated can supplement the commercial power supply. For example, in hot weather, it may be cost effective to run the generator constantly to drive an air conditioning system such as is indicated at 68.

When the secondary power source 40 includes the generator 60 but not the battery 52, it is necessary to keep the generator running constantly to ensure uninterruptible power. Otherwise, there would be a brief interruption in power to the load circuits 24 during the time it would take the generator 60 to start after an interruption of the commercial power supply. It would also be possible to run the generator 60 only when a power interruption appears likely, such as during a thunderstorm. This would not guarantee uninterrupted power, but would reduce the probability of an interruption.

When commercial power is restored, it recharges the battery 52 and the generator 60 is shut down. Power is again provided from the commercial source 10 to the direct current bus 50 through the first rectifier 42. Power on the direct current bus 50 is then inverted to power on the alternating current bus 20 (FIGS. 5–8). This occurs without interruption of power to the load circuits 24 and 25. By rectifying commercial AC power, it is possible to connect other power sources to the DC bus 50 without compatibility problems and multiple sources can be used concurrently.

Figures 4, 5:
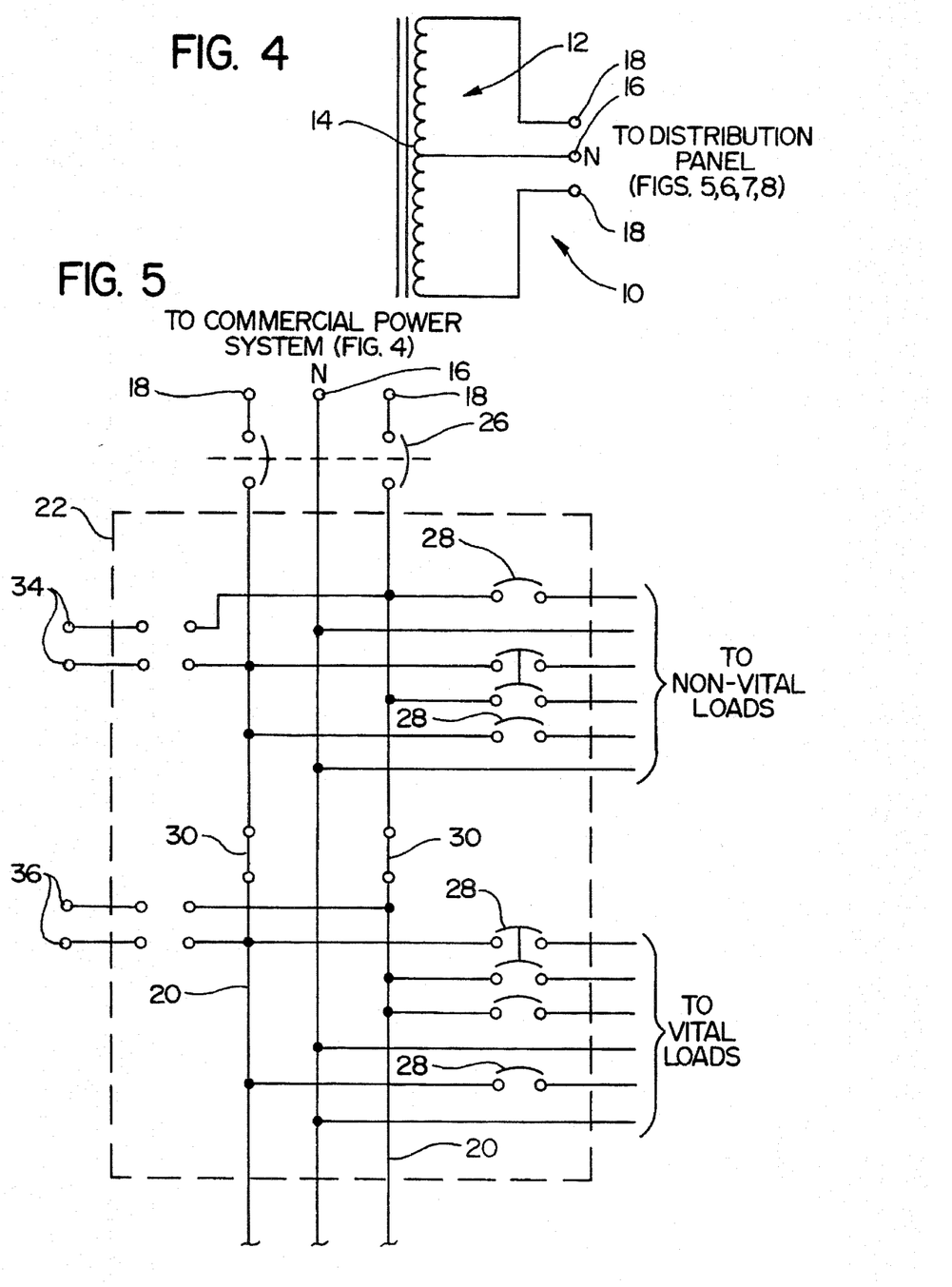
FIG. 4 is a simplified electrical schematic diagram showing the electrical elements used to obtain utility power from the commercial power system depicted in FIG. 1.
FIG. 5 is an electrical circuit diagram showing the distribution panel such as that depicted in FIG. 1 as it would be configured in a first mode for operation without a secondary power system.
Figure 6:
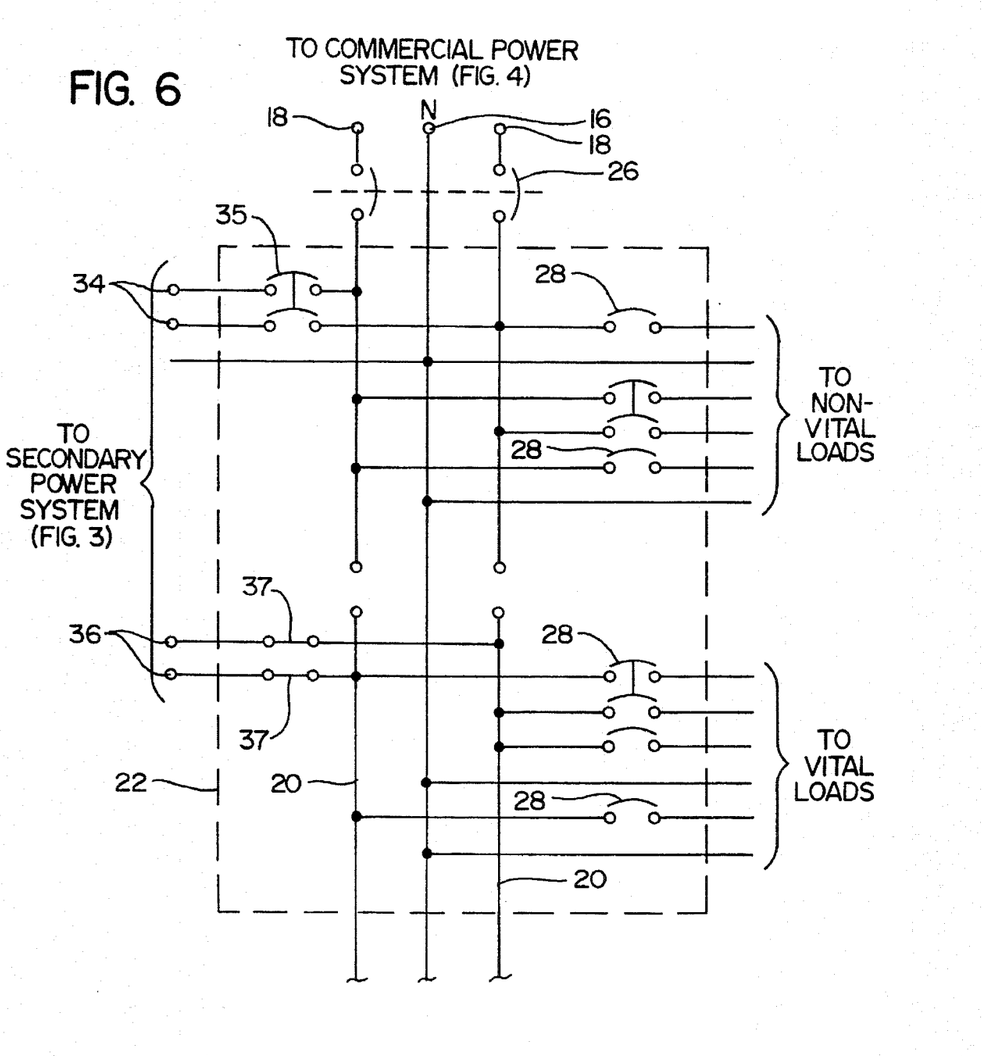
FIG. 6 is an electrical circuit diagram showing the distribution panel of FIG. 1 configured in a second mode for use with a secondary power system.
Figure 7:
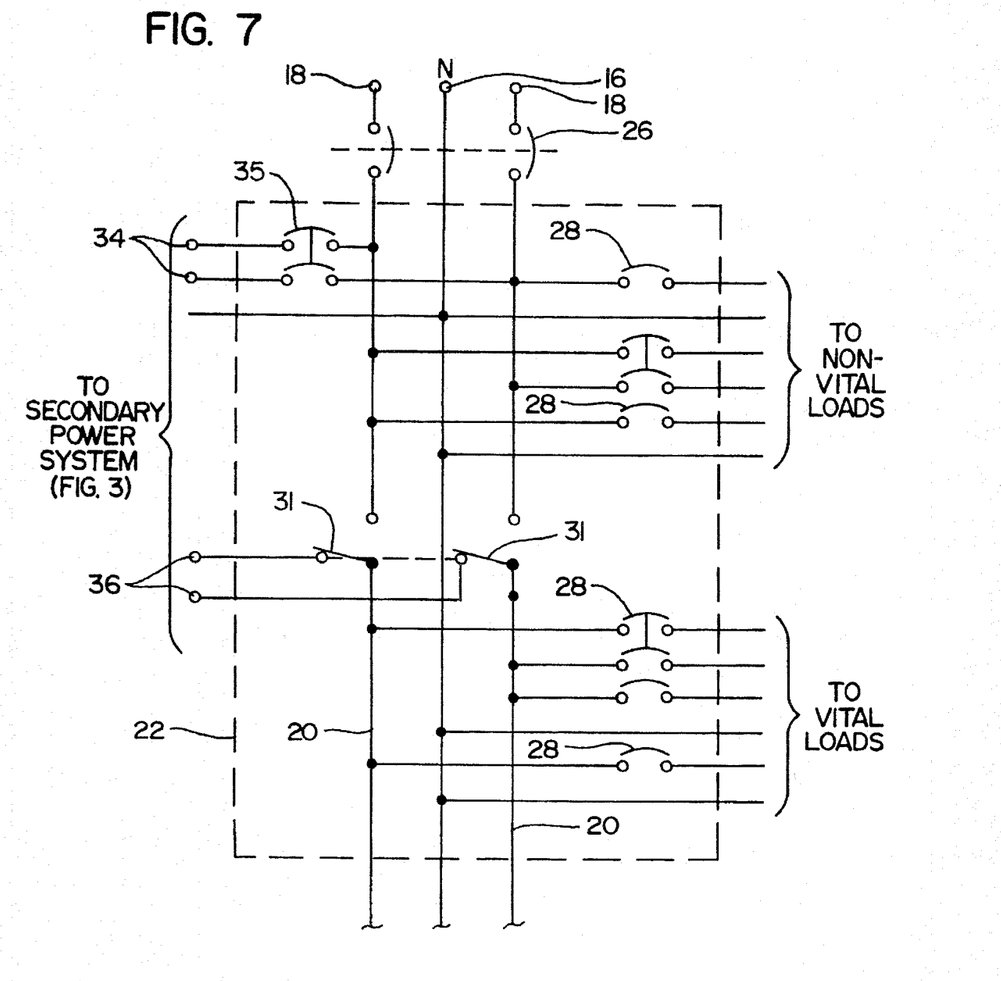
FIG. 7 is an electrical circuit diagram showing the distribution panel of FIG. 1 configured in a third mode for use with a secondary power system.
Figure 8:
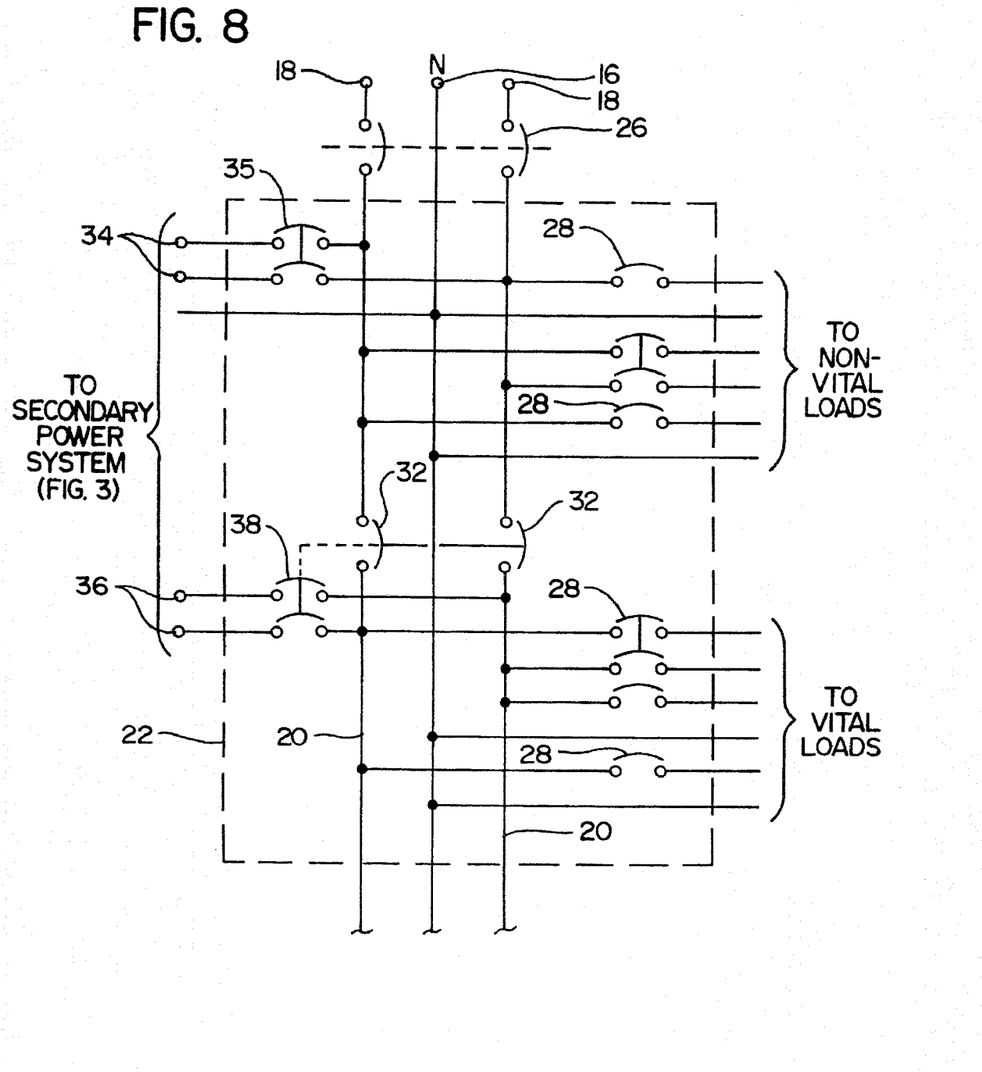
FIG. 8 is an electrical circuit diagram showing the distribution panel of FIG. 1 configured in a fourth mode for use with a secondary power system.

The power distribution panel 22 facilitates installation and maintenance of the secondary power supply system 40. The power distribution panel can be used in one of a number of configurations or modes, and four of these configurations are shown in FIGS. 5–8. Referring initially to FIG. 5, the primary power supply or commercial power 10 is provided to the distribution panel 22 through terminals 16 and 18 and a disconnect circuit breaker 26, which can be internal or external to the distribution panel. The commercial power is connected to the alternating current bus 20 in the panel 22, which in turn is connected to load circuits 24 through circuit breakers 28. Non-vital load circuits 25 can also be supplied by the commercial power. The non-vital load circuits 25 supply power to loads which can tolerate discontinuous power without serious adverse consequences. These would include most household lights and appliances. Loads which require continuous power, such as computers, refrigerators and sump pumps, would be powered by load circuits 24. The alternating current bus 20 and the primary power supply can be electrically separated by selective connection means such as a shorting insert 30 (FIG. 5), a bus transfer switch 31 (FIG. 7) (FIG. 5) or a circuit breaker 32 (FIG. 8). The shorting insert 30 or jumper is preferably mounted in a block or holder made of insulating material to facilitate safe removal and installation. Input terminals 34 are provided which can be connected to the secondary power supply system 40 at the input to rectifier 42. The input terminals 34 are connectable to the commercial power 10 by connection means 35 (FIGS. 6–8) such as a shorting insert or a circuit breaker. Output terminals 36 are provided for connection to the secondary power system 40 at the output of autotransformer 80. The output terminals are connectable to the AC bus 20 through connection means such as a shorting insert 37 (FIG. 6), the bus transfer switch 31 (FIG. 7) or a circuit breaker 38 (FIG. 8). Preferably, the circuit breakers 32 and 38 (FIG. 8) are interlocked to prevent them from both being in a closed state at the same time.

The distribution panel 22 is installed in the same manner as distribution panels commonly in use. Commercial power is supplied to the electrical load circuits 24 and 25 and is controlled by the circuit breakers 28.

Installation of the secondary power system 40 can be accomplished at any time after the distribution panel 22 is installed without disconnecting the commercial power 10 from the distribution panel and with only momentary interruption of power to the load circuits 24. The secondary power system 40 is connected to the terminals 34 and 36 and the connection means 35 is closed. Power supply to the load circuits 24 is then transferred from the primary power supply 10 to the secondary power system 40 by removing the shorting plug 30 or jumper and inserting the shorting plug 37, which can be the same plug simply moved from one socket to another. Alternatively, the bus transfer switch 31 (FIG. 7) can be switched or, as shown in FIG. 8, the circuit breaker 32 can be opened and the circuit breaker 38 closed to transfer the power supply. The secondary power system 40 supplies continuous power to the load circuits 24 as discussed above. The primary power supply 10 continues to supply power directly to the non-vital load circuits 25 so long as primary power is available. When primary power is not available, the non-vital load circuits 25 do not receive power while the load circuits 24 are powered by the battery or generator of the secondary power system.

Servicing or removal of the secondary power system is accomplished by reversing the steps of installation. In FIG. 8, for example, the circuit breaker 38 is opened, the circuit breaker 32 is closed and the connection means 35 is opened. Thus, power is supplied to the load circuits 24 by the primary power supply and the secondary power system is disconnected.

The present disclosure describes several embodiments of the invention, however, the invention is not limited to these embodiments. Other variations are contemplated to be within the spirit and scope of the invention and appended claims.

What we claim is:

1. A power distribution panel connectable between a primary power supply and electrical load circuits for facilitating installation of a secondary power system comprising:
   an alternating current bus connectable to the load circuits;
   first means to selectively connect the primary power supply to the alternating current bus;
   second means to selectively connect the primary power supply to terminals for connection to an input of the secondary power supply; and
   third means to selectively connect the alternating current bus to terminals for connection to an alternating current output from the secondary power supply.

2. A power distribution panel according to claim 1, wherein said first and third selective connection means are operatively linked so that both cannot be simultaneously connected.

3. A power distribution panel according to claim 1, further comprising a non-vital alternating current bus connectable to the primary power supply.

4. A power distribution panel according to claim 1, further comprising means to connect a neutral voltage of the primary power supply to at least one neutral terminal for connection to other components.

5. A power distribution panel according to claim 1, wherein said first and third selective connection means collectively comprise a bus transfer switch.

6. A power distribution panel according to claim 1, wherein the first connection means is a shorting insert.

7. A power distribution panel according to claim 1, wherein the second connection means is a shorting insert.

8. A power distribution panel according to claim 1, wherein the first and third connection means are circuit breakers.

9. A power distribution panel connectable between a primary power supply and electrical load circuits for facilitating installation of a secondary power system comprising:
   an alternating current bus;
   first terminals connected to the alternating current bus;
   second terminals connected to the alternating current bus;
   third terminals connected to the alternating current bus;
   fourth terminals connected to the alternating current bus;
     wherein the control panel may be operated in
   a first mode in which the first terminals are connected to the primary power source, the second terminals are connected to the electrical load circuits, and the third and fourth terminals are not connected to the secondary power source such that power is supplied to the electrical load circuits only by the primary power source; and
   a second mode in which the first terminals are connected to the primary power source, the second terminals are connected to the electrical load circuits, the third terminals are connected to input terminals of the secondary power source, and the fourth terminals are connected to output terminals of the secondary power source such that power may be supplied to the electrical load circuits by the secondary power source if power from the primary power source is interrupted.

10. A power distribution panel as recited in claim 9, further comprising first switch means for allowing the alternating current to be divided into first and second bus portions, where the first and third terminals are connected to the first bus portion, the fourth terminals are connected to the second bus portion, and the second terminals comprise (a) vital terminals connected to the second bus portion and to vital electrical circuits and (b) non-vital terminals connected the first bus portion and to non-vital electrical circuits, wherein vital electrical circuits comprise loads that require continuous power and non-vital electrical circuits comprise loads that can tolerate discontinuous power without serious adverse consequences.

11. A power distribution panel as recited in claim 10, in which the first switch means comprises a component selected from the list of components comprising a shorting insert, a bus transfer switch, and a circuit breaker.

12. A power distribution panel as recited in claim 10, further comprising second switch means connected between the alternating current bus and the third terminals and fourth switch means connected between the alternating current bus and the fourth terminals.

13. A power distribution panel as recited in claim 12, in which the first and third switch means are interconnected such that the first and third switch means may not be closed at the same time.

14. A power distribution panel as recited in claim 12, in which the second and third switch means are circuit breakers.

15. A power distribution panel as recited in claim 12, in which the first and third switch means are formed by first and second bus transfer switches.

16. A method of distributing power to electrical load circuits, comprising the steps of:

providing an alternating current bus;

providing first terminals connected to the alternating current bus;

providing second terminals connected to the alternating current bus;

providing third terminals connected to the alternating current bus;

providing fourth terminals connected to the alternating current bus;

connecting the first terminals to a primary power supply;

connecting the second terminals to the electrical load circuits;

operating the load circuits solely on power supplied by the primary power supply;

connecting the third terminals to an input of a secondary power system and the fourth terminals to an output of the secondary power system; and operating the load circuits on power supplied by the secondary power system when power from the primary power supply is interrupted.

17. A method as recited in claim 16, further comprising the steps of:

dividing the alternating current bus into first and second bus portions;

dividing the second terminals into non-vital terminals connected to the first bus portion and vital terminals connected to the second bus portion;

dividing the load circuits into vital load circuits and non-vital load circuits, where vital load circuits comprise loads that require continuous power and non-vital load circuits comprise loads that can tolerate discontinuous power without serious adverse consequences; and connecting vital load circuits to the vital terminals and non-vital load circuits to the non-vital terminals; wherein the first and third terminals are connected to the first bus portion; and the fourth terminals are connected to the second bus portion.

* * * * *